United States Patent
Shill et al.

(10) Patent No.: US 9,380,426 B2
(45) Date of Patent: Jun. 28, 2016

(54) METHODS, DEVICES, AND COMPUTER READABLE STORAGE DEVICES FOR TRACKING THE LOCATIONS OF MOBILE TARGET COMMUNICATION DEVICES WITH RESPECT TO THE LOCATION OF A HOST COMMUNICATION DEVICE OVER TIME

(71) Applicant: AT&T Intellectual Property I, L.P., Atlanta, GA (US)

(72) Inventors: Scott Shill, Atlanta, GA (US); Brad Ree, Cumming, GA (US); Michael Glazebrook, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/273,165

(22) Filed: May 8, 2014

(65) Prior Publication Data

US 2015/0327016 A1    Nov. 12, 2015

(51) Int. Cl.
*H04W 24/00* (2009.01)
*G08B 1/08* (2006.01)
*H04W 4/02* (2009.01)

(52) U.S. Cl.
CPC .................. *H04W 4/023* (2013.01)

(58) Field of Classification Search
CPC ............. B60R 2325/105; G08B 13/1427; G08B 13/2402
USPC .................. 455/456.1; 340/539.13, 539.21
See application file for complete search history.

(56) References Cited

U.S. PATENT DOCUMENTS

| | | |
|---|---|---|
| 5,651,548 A | 7/1997 | French et al. |
| 7,009,512 B2 | 3/2006 | Cordoba |
| 7,333,776 B1 | 2/2008 | York |
| 7,872,578 B2 | 1/2011 | Sher |
| 7,893,876 B2 | 2/2011 | Brown et al. |
| 8,149,125 B2 | 4/2012 | Geissler et al. |

(Continued)

FOREIGN PATENT DOCUMENTS

EP    2541523    1/2013

OTHER PUBLICATIONS

Marco et al. "Location-based services for elderly and disabled people", ScienceDirect, Computer Communications 31:1055-1066 (2008).

(Continued)

*Primary Examiner* — Thomas Lett
(74) *Attorney, Agent, or Firm* — Hartman & Citrin LLC

(57) ABSTRACT

A distance between a host communication device and a mobile target communication device at multiple times over a time period based on a received signal emitted by the mobile target communication device. An amount of time that the distance between the host communication device and the mobile target communication device is within a distance threshold is also determined. A determination is further made whether the amount of time the distance between the host communication device and the mobile target communication device is within the distance threshold is less than a predetermined amount of time. If the amount of time that the distance between the host communication device and the mobile target communication device is within the distance threshold is less than the predetermined amount of time, transmission of a notification to a third party is initiated via a gateway.

20 Claims, 4 Drawing Sheets

(56) References Cited

U.S. PATENT DOCUMENTS

| | | |
|---|---|---|
| 8,521,134 B2 | 8/2013 | Huckins |
| 8,616,984 B2 | 12/2013 | Mattice et al. |
| 8,622,842 B2 | 1/2014 | Nguyen et al. |
| 2001/0034233 A1 | 10/2001 | Tiedemann, Jr. et al. |
| 2002/0034978 A1 | 3/2002 | Legge et al. |
| 2005/0040944 A1* | 2/2005 | Contestabile ............ 340/539.13 |
| 2005/0116020 A1 | 6/2005 | Smolucha et al. |
| 2007/0176782 A1 | 8/2007 | Mohalik |
| 2008/0231462 A1* | 9/2008 | Hobart ........................ 340/686.6 |
| 2009/0191955 A1 | 7/2009 | Seelig et al. |
| 2010/0265131 A1 | 10/2010 | Fabius |
| 2012/0075097 A1 | 3/2012 | Jacobson |
| 2012/0092130 A1* | 4/2012 | Chung et al. ................. 340/10.1 |
| 2013/0169434 A1 | 7/2013 | McCown et al. |
| 2013/0346550 A1 | 12/2013 | Higgins |
| 2014/0004936 A1 | 1/2014 | Morrow |

OTHER PUBLICATIONS

Hou at al. "PAS: A Wireless-Enabled, Sensor-Integrated Personal Assistance System for Independent and Assisted living", IEEE Joint Workshop on High Confidence Medical Devices, pp. 64-75 (2007)/.

Capkun et al. "Secure Location Verification With Hidden and Mobile Base Stations", IEEE Transactions, pp. 470-483 (2008).

Varshavsky et al. "Amigo: Proximity-Based Authentication of Mobile Devices", UbiComp, pp. 253-270 (2007).

Tennina et al. "Automatic Personal Identification System for Security in Critical Services: Two Case Studies Based on a Wireless Biometric Badge", www.intechopen.com, pp. 44-62 (2011).

Shmatikov et al. "Secure Verification Claims with Simultaneous Distance Modification", The Univ of Texas at Austin 15 pp (Search report date Feb. 2014).

Sandata Technologies—Santrax Telephony, http://sandata.com/agency/telephony/default.aspx (printed May 2014).

* cited by examiner

METHODS, DEVICES, AND COMPUTER READABLE STORAGE DEVICES FOR TRACKING THE LOCATIONS OF MOBILE TARGET COMMUNICATION DEVICES WITH RESPECT TO THE LOCATION OF A HOST COMMUNICATION DEVICE OVER TIME

TECHNICAL FIELD

The present disclosure relates generally to telecommunications, and, more particularly, to tracking locations of mobile communication devices.

BACKGROUND

Monitoring of personal interactions between parties, such as elderly patients or children and caregivers, is important to ensure that the caregivers are giving proper attention to those they are entrusted to provide care for. In the past, such monitoring has been a somewhat difficult task, as those for whom care is provided often cannot accurately recall details of the interactions with their caregivers.

Technology has been put in place to monitor such interactions. For example, remote video monitoring cameras, often referred to as "nanny cams", have been used to record interactions. However, this type of monitoring is limited in that it is "line of sight" monitoring. That is, the camera can only record what is happening within sight of the camera lens. The camera cannot record what may be happening out of sight.

Bar code readers and near field communication (NFC) tags have been employed for monitoring the movement of parties, such as incarcerated individuals. For example, the incarcerated individual wears a badge or other device having a bar code or NFC tag, and as that individual passes by a bar code reader or comes within range of an NFC receiver, the location of the individual is recorded. Thus, movement of the individual may be monitored as the individual passes by bar code scanners or comes within range of an NFC receiver. Like the camera, however, bar code readers and NFC tags are limited by the short range of the scanner/receiver. Also, bar code readers and NFC scanners are limited to detecting motions at extremely short distances.

Conventional monitoring techniques, such as those described above, also typically require someone to review a video (as it is being recorded or after it is recorded) or a log of scans to monitor interactions and movement. This is a tedious task that may require several hours of undivided attention. Improper care by a caregiver or improper movement of an individual may be not discovered until well after the fact, if at all.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for tracking the locations of mobile target communication devices with respect to a location of a host communication device over time. The method includes determining, by a processor within the host communication device, a distance between the host communication device and a mobile target communication device at each of multiple times over a time period based on a received signal emitted by the mobile target communication device at each of the multiple times. The method further includes determining, by the processor, an amount of time within the time period that the distance between the host communication device and the mobile target communication device is within a distance threshold based on the distance determined for each of the multiple times. The method further includes determining, by the processor, whether the amount of time the distance between the host communication device and the mobile target communication device is within the distance threshold is less than a predetermined amount of time within the time period. The method further includes initiating transmission of a notification to a third party via a gateway responsive to determining that the amount of time that the distance between the host communication device and the mobile target communication device is within the distance threshold is less than the predetermined amount of time.

According to another embodiment, a system within a host communication device is provided for tracking the locations of mobile target communication devices with respect to a location of the host communication device over time. The system includes a processor and a memory. The memory has instructions stored thereon which, when executed by the processor, cause the processor to perform operations. The operations include determining a distance between the host communication device and a mobile target communication device at each of multiple times over a time period based on a received signal emitted by the mobile target communication device at each of the multiple times. The operations further include determining an amount of time within the time period that the distance between the host communication device and the mobile target communication device is within a distance threshold based on the distance determined for each of the multiple times. The operations further include determining whether the amount of time the distance between the host communication device and the mobile target communication device is within the distance threshold is less than a predetermined amount of time within the time period. The operations further include initiating transmission of a notification to a third party via a gateway responsive to determining that the amount of time that the distance between the host communication device and the mobile target communication device is within the distance threshold is less than the predetermined amount of time.

According to another embodiment, a computer-readable storage device within a host communication device is provided for tracking the locations of mobile target communication devices with respect to a location of the host communication device over time. The computer readable storage device has instructions encoded thereon which, when executed by a processor, cause the processor to perform operations. The operations include determining a distance between the host communication device and a mobile target communication device at each of multiple times over a time period based on a received signal emitted by the mobile target communication device at each of the multiple times. The operations further include determining an amount of time within the time period that the distance between the host communication device and the mobile target communication device is within a distance threshold based on the distance determined for each of the multiple times. The operations further include determining whether the amount of time the distance between the host communication device and the mobile target communication device is within the distance threshold is less than a predetermined amount of time within the time period. The operations further include initiating transmission of a notification to a third party via a gateway responsive to determining that the amount of time that the distance between the host communication device and the mobile target communication device is within the distance threshold is less than the predetermined amount of time.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1:
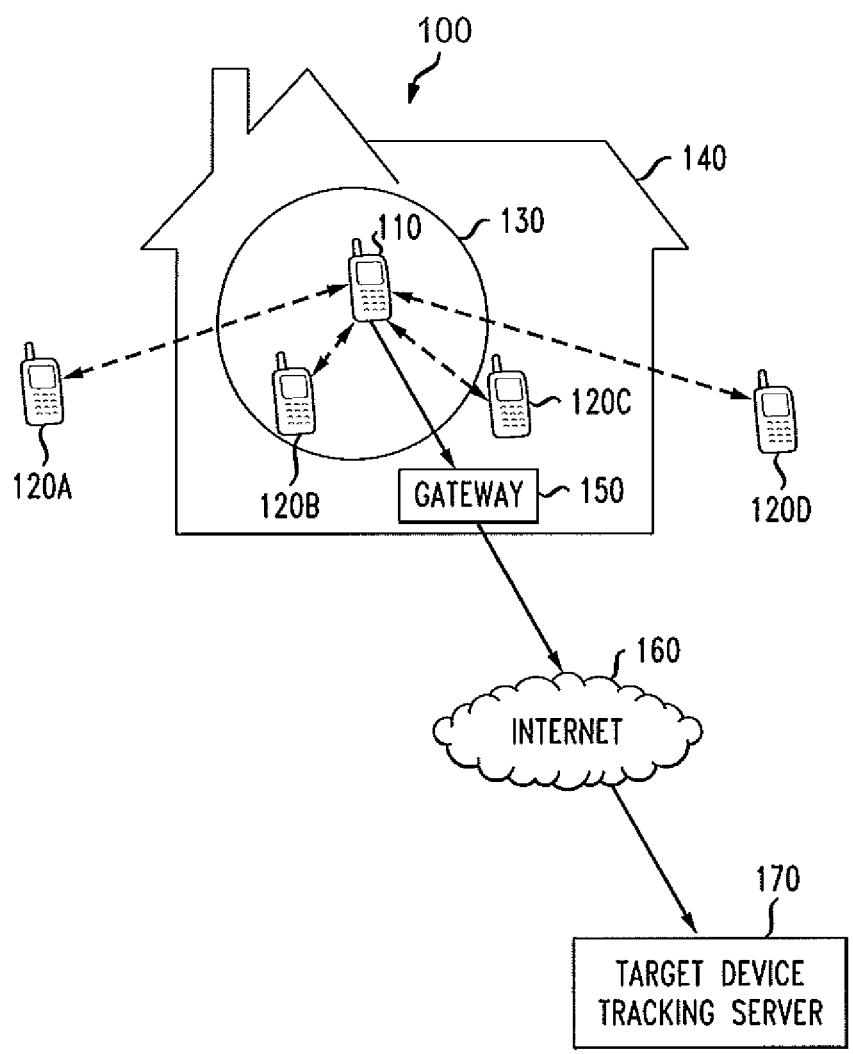
FIG. 1 illustrates an environment in which a system for tracking the locations of mobile target communication devices with respect to a location of a host communication device may be implemented according to an illustrative embodiment.

Referring now to the figures, FIG. 1 illustrates an environment in which a system for tracking the locations of mobile target communication devices with respect to a location of a host communication device may be implemented according to an illustrative embodiment. A host communication device 110 is associated with an individual for whom monitoring is provided, such as a child or an elderly patient. The host communication device 110 may be located within a premises 140. The premises 140 may be a residence or another location where the individual for whom monitoring is provided is located. The host communication device 110 may be a mobile communication device or a fixed communication device. The host communication device 110 is in communication with a gateway 150 incorporated within or attached to the premises 140 as described in further detail below.

The mobile target communication devices 120A, 120B, 120C, and 120D may be associated with individuals being monitored, such as caregivers. The host communication device 110 listens for signals or "beacons" emitted by the mobile target communication devices 120A, 120B, and 120C, and 120D. These signals may be periodically emitted multiple times over a time period and received via a radio link, such as Bluetooth, Wi-Fi, cellular, Zigbee, etc. The beacons may be emitted at a specified rate which may be adjustable to preserve battery life. Further details regarding the communication devices 110, 120A, 120B, 120C and 120D are described below with reference to FIG. 2. Details regarding implementation of the gateway 150 are provided below with reference to FIG. 3.

According to an illustrative embodiment, the host communication device 110 determines a distance between itself and each of the mobile target communication devices 120A, 120B, 120C, and 120D at multiple times over a time period, e.g., several hours. The host communication device 110 determines the distance between itself and each of the mobile target communication devices 120A, 120B, 120C, and 120D based, e.g., on the received signal strength of the emitted beacon signals.

For example, a Bluetooth signal emitted by a mobile communication device is typically emitted with a power of approximately 2.5 mW. A Wi-Fi signal is typically emitted by a mobile communication device with a power of approximately 100 uW with a maximum power output of 100 mW. The host communication device 110 may be programmed in advance with information regarding the emission power of these radio signals so that it is able to determine an approximate distance to a mobile target communication device 120A, 120B, 120C, and 120D based on the signal strength of the beacon signals received from the mobile target communication device 120A, 120B, 120C, and 120D.

The host communication device 110 determines an amount of time that the distance between itself and each of the mobile target communication devices 120A, 120B, 120C, and 120D is within a distance threshold surrounding the host communication device 110. This distance threshold is represented in FIG. 1 as a virtual perimeter 130. If a mobile target communication device, such as the mobile target communication device 120A, 120C, 120D is at a distance greater than the distance threshold, that mobile target communication device 120A, 120C, 120D may be considered to have "breached" the virtual perimeter 130. If the amount of time that the distance between one or more mobile target communications device 120A, 120B, 120C, and 120D is within the distance threshold is determined to be less than a predetermined amount of time—that is one or more of the mobile target communication devices 120A, 120B, 120C, and 120D has breached the virtual perimeter for the predetermined amount of time, the host communication device 110 may send a notification to a third party target device tracking server 170 via the gateway 150. The gateway 150 is advantageous, e.g., if the host communication device 110 does not have cellular or other telecommunication capabilities for communicating with the third party target device tracking server 170.

It should be appreciated that the distance threshold represented as the virtual perimeter 130 may be adjustable, depending on the circumstances. For example, if an individual being monitored using the host communication device 110 requires regular close contact, as in the case of a small child playing in a backyard, the virtual perimeter 130 may be set, e.g., at 5 feet. If the individual being monitored using the host communication device 110 does not require close contact, as in the case of an elderly person in a house who needs to be checked daily by a caregiver, the virtual perimeter 130 may be set, e.g., at 20 feet.

It should further be appreciated that the predetermined amount of time and the time period for which monitoring occurs may be adjustable, depending on the circumstances. For example, in the case of the small child being cared for, the predetermined amount of time may be set to a small amount of time, e.g., 10 minutes, and the time period may be set to 8 hours. In the case of the elderly patient who only needs to be checked on once a day, the predetermined amount of time may be set to a longer amount of time, e.g., 12 hours within a 24 hour time period. In addition, it should be appreciated that as the host communication device 110 moves, the virtual perimeter 130 surrounding it moves.

If a mobile target communication device 120A, 120B, 120C, and 120D is not within a short enough range from the host communication device 110, the host communication device 110 will not receive beacon signals. In this case, the host communication device 110 may assume that the mobile target communication device 120A, 120B, 120C, and 120D is within the virtual perimeter for an amount of time that is less than a predetermined amount of time and may report this to the target device tracking server 170 via the gateway 150.

The host communication device 110 communicates with the gateway 150 via, e.g., a wired or wireless home network including, e.g., a Wi-Fi connection, a Bluetooth connection, an NFC connection, etc. or via any other suitable communication network.

The gateway 150 relays information received from the host communication device 110 to the target device tracking server 170. The target device tracking server 170 may be associated with a third party, such as a health care or child care administrator, having an interest in monitoring the locations of the mobile target communication devices 120A, 120B, 120C, and 120D with respect to the host communication device 110.

Responsive to an indication from the host communication device 110 that the virtual perimeter 130 has been breached by one or more of the mobile target communication devices 120A, 120B, 120C and 120D for the predetermined amount of time, the gateway 150 may generate an alert and send the alert to the target device tracking server 170. The indication of the breach may be received by the gateway 150, and the alert may be generated and sent in real time. As an alternative, the gateway 150 may relay the information received from the host communication device 110 in real time to the target device tracking server 170. The target device tracking server 170 may then generate an alert in real time.

According to an illustrative embodiment, the target device tracking server 170 sends an alert to appropriate third parties, e.g., relatives of the individual for whom monitoring is provided, emergency service personnel, etc. The alert may be sent in real time so that appropriate action may be swiftly taken to care for the individual for whom monitoring is provided. The parties provided with the alert may be designated in advance and may be changed depending upon the circumstances of the individual for whom monitoring is provided.

The gateway 150 communicates with the target device tracking server 170 via a network 160, e.g., the Internet. The gateway 150 may also communicate with the target device tracking server 170 via other networks, e.g., a cellular network in communication with the Internet. A cellular network may operate according a protocol dictated by telecommunications standards, such as Global System for Mobile communications (GSM) and a Universal Mobile Telecommunications System (UMTS). It should be understood, however, that the network 160 may be implemented using wireless networks that use any existing or yet to be developed telecommunications technology. For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

As indicated above, the gateway 150 may send an alert or relay the information from the host communication device 110 to the target device tracking server 170 in real time, and the target device tracking server 170 may generate an alert or send the alert to designated parties in real time. It should be appreciated, however, that such communications need not occur in real time but may occur at regular short intervals or in response to a request. For example, the notification that the virtual perimeter has been breached for a predetermined amount of time may be provided upon request by the target tracking device server 170.

The target device tracking server 170 may be a server within a cloud computing network (not shown). Although details of the target device tracking server 170 are not shown, it should be appreciated that the target device tracking server 170 may include similar components as the gateway 150, e.g., a processor and a memory containing instructions executable by the processor to cause the processor to perform operations including sending alerts to third parties.

As an alternative to the host communication device 110 determining whether the virtual perimeter 130 has been breached for a predetermined amount of time, the host communication device 110 may report the determined distances between itself and the mobile target communication devices 120A, 120B, 120C, and 120D to the gateway 150, and the gateway may make the determination whether the virtual perimeter 130 has been breached for a predetermined amount of time. As yet another alternative, the gateway 150 may simply relay the determined distance information to the target device tracking server 170, and the target device tracking server 170 may make the determination as to whether the virtual perimeter 130 has been breached for a predetermined amount of time.

According to an illustrative embodiment, the host communication device 110 may determine the identity of each of the mobile target communication devices 120A, 120B, 120C, and 120D. For example, the host communication device 110 may match a mac address of the received beacon signal with an International Mobile Subscriber Identity (IMSI), a phone number, and/or a device identifier stored in a database. This database may be maintained, e.g., by a server, and may be updated as needed, e.g., by a service provider, as mobile target communication devices 120A, 120B, 120C, and 120D are "paired" with the host communication device 110. The identifiers of the mobile target communication devices 120A, 120B, 120C, and 120D may be pushed down from the server to the gateway 150 via the Internet, such that the gateway 150 maintains an active list of identifiers of valid/paired mobile target communication devices 120A, 120B, 120C, and 120D. The host communication device 110, in turn, may pull the information identifying the mobile target communication devices 120A, 120B, 120C, and 120D from the gateway 150 as needed for comparison with the information received in the beacon signals. As an alternative, the host communication device 110 may maintain a list of identifiers of mobile target communication devices 120A, 120B, 120C, and 120D in a local database, updating the list on a regular basis with information maintained by the gateway 150.

In addition, a group of mobile target communication devices 120A, 120B, 120C, and 120D may be identified by the host communication device 110. For example, the host communication device 110 may maintain a contact list that assigns phone numbers or device identifiers of the mobile target communication devices 120A, 120B, 120C, and 120D to groups, and the identity of a group of mobile target communication devices 120A, 120B, 120C, and 120D may be determined by matching the phone numbers or device identifiers with the phone numbers or device identifiers in the assigned groups.

According to an illustrative embodiment, the identity of a mobile target communication device 120A, 120B, 120C, and 120D that breaches the virtual perimeter 130 for a predetermined amount of time may be provided by the host communication device 110 to the target device tracking server 170 via the gateway 150. In addition or as an alternative, the identity of a group of mobile target communication devices 120A, 120B, 120C, and 120D that breach the virtual perimeter 130 for a predetermined amount of time may be provided. As yet another alternative, the identity of a breaching mobile target communication device 120A, 120B, 120C, and 120D or the identify of a group of breaching mobile target communication devices 120A, 120B, 120C, and 120D may be determined by the gateway 150 or the target device tracking server 170 based, e.g., on mac addresses of received signals reported by the host communication device 110.

In the embodiments described above, the host communication device 110 initiates a notification to the gateway 150 when one or more mobile target communication device 120A, 120B, 120C, and 120D breaches the virtual perimeter 130 for a predetermined amount of time. As an alternative or in addition, the host communication device 110 may initiate such a notification when a group of mobile target communication devices 120A, 120B, 120C, and 120D breach the virtual perimeter 130 for the predetermined amount of time and/or when a predefined number of mobile target communication devices 120A, 120B, 120C, and 120D breach the virtual perimeter for the predetermined amount of time.

Figure 2:
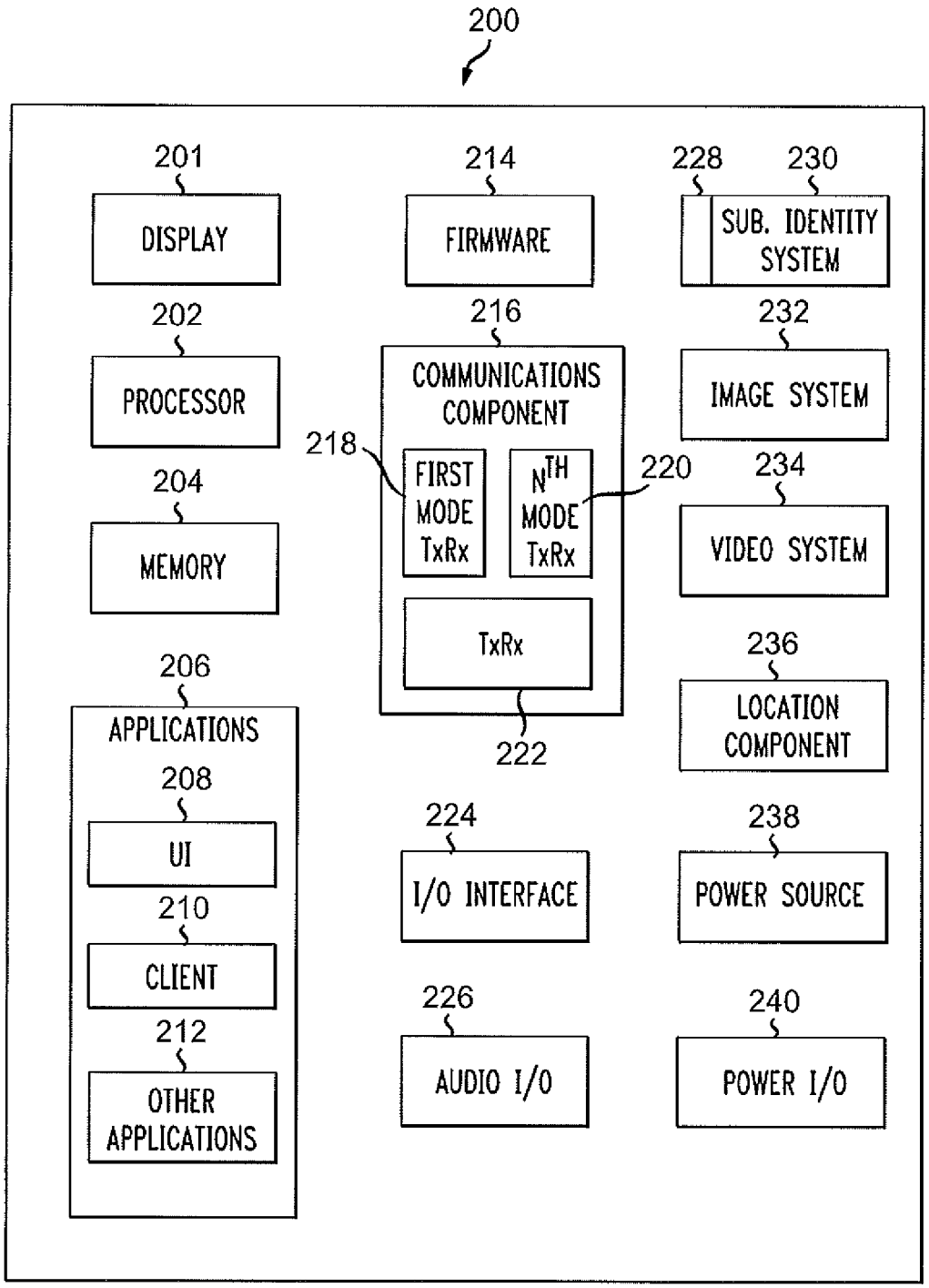
FIG. 2 illustrates a communication device according to an illustrative embodiment.

FIG. 2 illustrates a schematic block diagram of an illustrative communication device 200 with which the communication devices 110, 120A, 120B, 120C, and 120D may be implemented, according to an illustrative embodiment. The device 200 may be a multimode handset and can include a variety of computer-readable media. Although no connections are shown between the components illustrated in FIG. 2, those skilled in the art will appreciate that the components can interact with each other via any suitable connections to carry out device functions.

The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like.

The device 200 may include a processor 202 for controlling and/or processing data. A memory 204 can interface with the processor 202 for the storage of data and/or applications 206. Although shown as a separate component, the applications 206 may be stored in the memory 204 or in another memory. The applications 206 may include, for example, SMS messaging software, EMS message software, MMS messaging software, USSD software, a WAP browser, and the like.

In the case of the host communication device 110, the data stored in the memory 204 may include, for example, power emission levels for short-range radio signals emitted from mobile target communication devices 120A, 120B, 120C, and 120D, contact lists of mobile target communication devices 120A, 120B, 120C, and 120D, a distance threshold defining the virtual perimeter 130, a predetermined amount of time after which a notification should be sent and a time period over which monitoring should occur, etc. In the case of the mobile target communication devices 120A, 120B, 120C, and 120D, the data may include, for example, data indicating the frequency with which beacon signals should be sent.

The applications 206 may also include a user interface (UI) application 208. The UI application 208 can interact with a client 210 (e.g., an operating system) to facilitate user interaction with device functionality and data, for example, viewing received messages, answering/initiating calls, entering/deleting data, password entry and settings, configuring settings, address book and contact list manipulation, and the like. In the case of the host communication device 110, the UI application 208 may also interact with the client to facilitate user input regarding the distance threshold defining the virtual perimeter, a time period over which monitoring should occur, the predetermined amount of time that triggers notification of a virtual perimeter breach, etc. In the case of the mobile target communication devices 120A, 120B, 120C, and 120D, the UI application 208 may also interact with the client 210 to facilitate user input regarding the frequency with which beacon signals should be sent. Such user interaction may be facilitated via, e.g., a keypad or a touchscreen included in the device 200 or communicating with the device via the I/O interface 224.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components. In the case of the host communication device 110, the other applications 212 may include an application for determining whether a virtual perimeter 130 has been breached by one or more mobile target communication devices 120A, 120B, 120C, and 120D for a predetermined amount of time, an application for generating and initiating transmission of a notification to a gateway 150, an application for identifying one or more mobile target communication devices 120A, 120B, 120C, and 120D, groups of mobile target communication devices 120A, 120B, 120C, and 120D, etc.

The applications 206 can be instructions contained on computer-readable media, excluding propagating signals, and may be stored in the memory 204. The applications 206 may, alternatively, be stored in firmware components 214. The applications 206 may be executed by the processor 202. The memory 204 and/or firmware 214 can also store code for execution during initialization of the device 200.

A communications component 216 may interface with the processor 202 to facilitate wired/wireless communication. In the case of the host communication device 110, the communications component 216 facilitates receipt of beacon signals from the mobile target communication devices 120A, 120B, 120C, and 120D. In the case of the mobile target communication devices 120A, 120B, 120C, and 120D, the communications component 216 facilitates transmission of the beacon signals.

The communications components 216 also facilitates with external systems including, for example, cellular networks, location systems, VoIP networks, local area networks (LAN's), wide area networks (WAN's), metropolitan area networks (MAN's), personal area networks (PAN's), and other networks, which may be implemented using WI-FI, WIMAX, combinations and improvements thereof, and the like. The communications component 216 can also include a multimode communication subsystem for providing cellular communications via different cellular technologies. For example, a first cellular transceiver 218 can operate in one mode, for example, a Global System for Mobile communications (GSM) mode, and an Nth transceiver 220 can operate in a different mode, for example a Universal Mobile Telecommunications Systems (UMTS) mode. While only two transceivers 218, 220 are illustrated, it should be appreciated that a plurality of transceivers may be included.

Also, it should be appreciated that the device 200 may include transceiver for operating in cellular modes other than GSM and UMTS. Such modes may operate according to standards for wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

The communications component 216 may also include a transceiver 222 for other communication technologies, such as, for example, WI-FI, WIMAX, BLUETOOTH, infrared, IRDA, NFC, RF, and the like. The communications components 216 may also facilitate reception from terrestrial radio networks, digital satellite radio networks; Internet based radio service networks, combinations thereof, and the like. The communications component 216 can process data from a cellular network, a corporate network, a home broadband network, a WI-FI hotspot, and the like via an ISP, DSL provider, or broadband provider. The communications component 216 can be used to transit notifications to the gateway 150.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combinations thereof, and the like. It should be appreciated that the I/O interface 224 can be used for communication between the device 200 and a network or local device instead of, or in addition to, the communications component 216.

Audio capabilities may be provided by an audio I/O component 226 that may include a speaker for the output of audio signals and a microphone to collect audio signals.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WI-FI/WIMAX and or cellular network triangulation data, combinations thereof, and the like. The location component 236 can interface with cellular network nodes, telephone lines, location transmitters and/or beacons, wireless network transmitters and receivers, for example, WI-FI hotspots, radio transmitters, combinations thereof and the like.

The device 200 may also include a power source 238, such as batteries and/or other power subsystems (AC or DC). The power source 238 can interface with an illustrative power system or charging equipment via a power I/O component 240.

Figure 3:
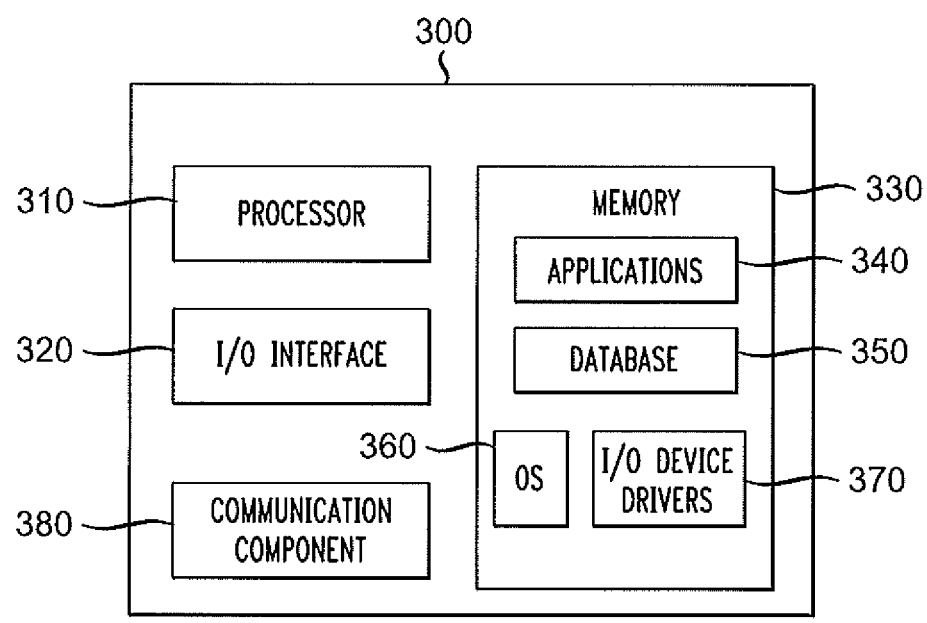
FIG. 3 illustrates a computing device with which a gateway may be implemented according to an illustrative embodiment.

FIG. 3 is a block diagram of a device 300 with which a gateway 150 may be implemented according to an illustrative embodiment. The device 300 includes a processor 310. Although only one processor is shown for simplicity of illustration, it should be appreciated that there may be multiple processors, which could include distributed processors or parallel processors in a single machine or multiple machines. The processor 310 may be used in supporting a virtual processing environment. Also, the processor may include an application specific integrated circuit (ASIC), programmable gate array (PGA) including a Field PGA, or state machine.

The processor 310 executes instructions stored in the memory 330 to perform operations. It should be appreciated that performance of these operations may include the processor 310 performing the operations directly and/or facilitating, directing, or cooperating with another device or component to perform the operations.

The processor 310 receives information, such as information indicating that the virtual perimeter 130 has been breached by one or more mobile target communication devices 120A, 120B, 120C and 120D for a predetermined amount of time, from the host communication device 110. This information is received via an I/O Interface 320.

The I/O Interface 320 can be implemented with, e.g., an interface including an antenna or other suitable type of transceiver through which data and signals may be transmitted and received. For example, the I/O interface 320 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like, excluding propagating signals.

As shown in FIG. 3, the memory 330 may include several categories of software and data used in the device 300, including, applications 340, a database 350, an operating system (OS) 360, input/output (I/O) device drivers 370, and a communications component 380. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including applications for generating an alert, applications for initiating transmission of an alert to the target device tracking server 170, etc. The applications 340 may be applied to data stored in the database 350, along with data, e.g., received via the I/O data interface 320, such as the information received from the host communication device 110. The database 350 represents the static and dynamic data used by the applications 340, the OS 360, the I/O device drivers 370 and other software programs that may reside in the memory.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

A communications component 380 may interface with the processor 310 to facilitate wired/wireless communication with systems and devices including, for example, the host communication device 110, the Internet 160 and other networks, the target device tracking server 170, etc. The communications component 380 can also include a multimode communication subsystem for providing cellular communications via different cellular technologies, such as GSM and UMTS. The communications component 380 may include a transceiver for other communication technologies, such as, for example, WI-FI, WIMAX, Bluetooth, infrared, IRDA, NFC, RF, and the like. The communications component 380 may also facilitate reception from terrestrial radio networks, digital satellite radio networks, Internet based radio service networks, combinations thereof, and the like.

It should be appreciated that the I/O interface 320 can be used for communication between the device and a network or local device instead of, or in addition to, the communications component 380.

It should be understood that FIGS. 2 and 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like. The term "computer-readable media" and variants thereof, as used in the specification and claims, can include storage media, excluding propagating signals. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information.

Figure 4:
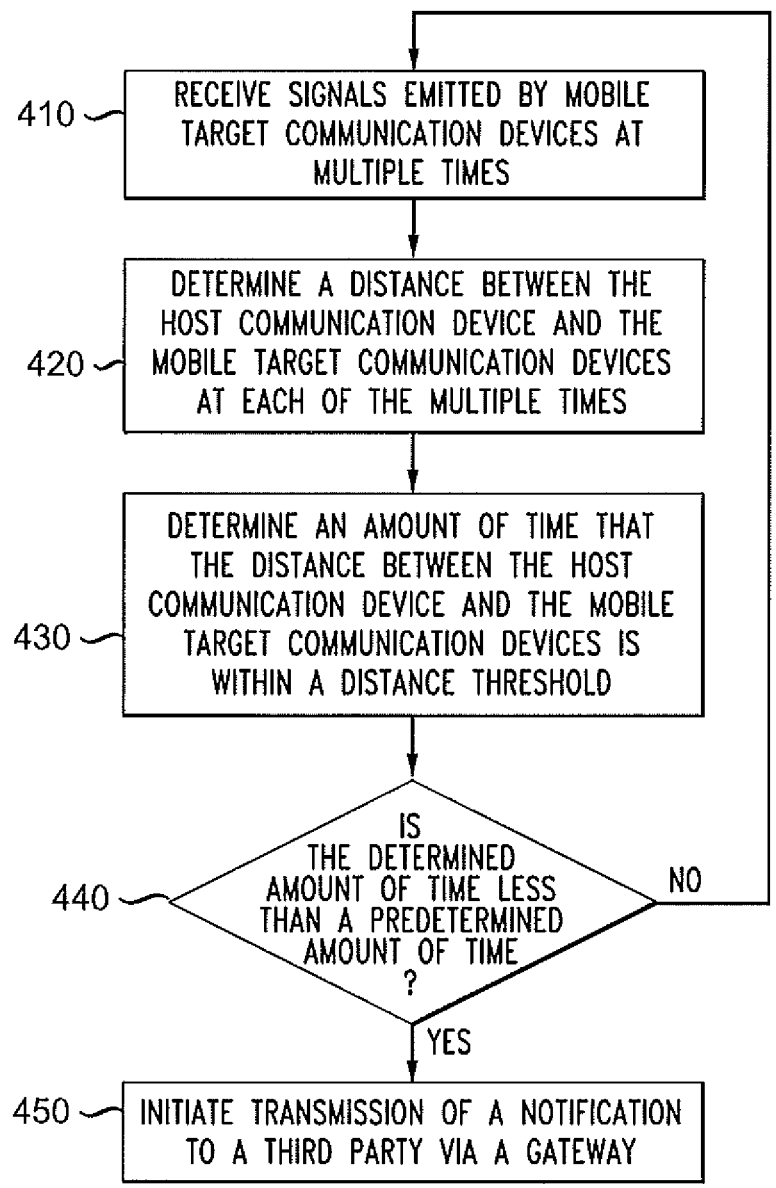
FIG. 4 illustrates a method for tracking the locations of mobile target communication devices with respect to a location of a host communication device according to an illustrative embodiment.

FIG. 4 illustrates a method 400 for tracking the locations of mobile target communication devices 120A, 120B, 120C, and 120D with respect to a location of a host communication device 110 according to an illustrative embodiment. Referring to FIG. 4, at step 410, beacon signals emitted by one or more mobile target communication devices, e.g., the mobile target communication devices 120A, 120B, 120C, and 120D, are received by the host communication device 110. Signals are received at multiple times over a given time period.

At step 420, the host communication device 110 determines a distance between it and each of the mobile target communication devices 120A, 120B, 120C and 120D emitting beacon signals at each of the multiple times. This determination may be based on the received signal strength of the beacon signals emitted by the mobile target communication device 120A, 120B, 120C, and 120D.

At step 430, an amount of time that the distance between the host communication device 110 and each of the mobile target communication devices 120A, 120B, 120C, and 120D is within a distance threshold, e.g., a virtual perimeter 130, is determined. At step 440, a determination is made whether the amount of time is less than a predetermined amount of time. This determination may be made by the host communication device 110. If the amount of time is not less than the predetermined amount of time, the process returns to step 410.

If the amount of time is less than the predetermined amount of time, this is indicative of a breach of the virtual perimeter 130 for the predetermined amount of time, and a notification of the breach is sent to the gateway 150. This notification may include an identity (or identities) of one or more mobile target communication devices 120A, 120B, 120C, and 120D that have breached the virtual perimeter 130 for the predetermined amount of time and/or the identity of a group of mobile target communication devices 120A, 120B, 120C, and 120D that have breached the virtual perimeter 130 for the predetermined amount of time. The notification may be in the form of an alert. Alternatively, the notification may be simply include an indication that one or more of the mobile target communication devices 120A, 120B, 120C and 120D are not within the virtual perimeter 130 for a predetermined amount of time, and the gateway 150 or the target device tracking server 170 may, in turn, generate an alert as appropriate.

Responsive to a notification or an alert from the gateway 150, the target device tracking server 170 may, in turn, send the alert to predetermined third parties. These third parties may include individuals and/or entities associated with a user of the host communication device 110, such as relatives, health care administrators, emergency service providers, etc.

Although not shown, it should be appreciated that after transmission of a notification is initiated, the process may return to step 410, and tracking of the locations of the mobile target communication devices may continue.

It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

It should be appreciated that the techniques described herein are not limited to monitoring interactions between individuals such as caregivers and patients/children. The techniques may also be applicable to monitoring movement of any individual carrying a mobile communication device with respect to a host communication device. Further the techniques may also be applicable to interactions with things or places, e.g., monitoring how long a security guard guarding a valuable item is within a close enough range of that which he or she is hired to guard for a sufficient amount of time.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A method, comprising:
    determining, by a processor within a host communication device, a distance between the host communication device and a mobile target communication device at each of multiple times over a time period based on a received signal emitted by the mobile target communication device at each of the multiple times;
    determining, by the processor, an amount of time within the time period that the distance between the host communication device and the mobile target communication device is within a distance threshold based on the distance determined for each of the multiple times;
    determining, by the processor, whether the amount of time the distance between the host communication device and the mobile target communication device is within the distance threshold is less than a predetermined amount of time within the time period; and
    initiating transmission of a notification to a third party via a gateway responsive to determining that the amount of time that the distance between the host communication device and the mobile target communication device is within the distance threshold is less than the predetermined amount of time.

2. The method of claim 1, wherein determining the distance between the host communication device and the mobile target communication device based on the received signal received at each of the multiple times includes determining a signal strength of the received signal received at each of the multiple times and estimating the distance between the host communication device and the mobile target communication device at each of the multiple times based on the signal strength of the received signal received at each of the multiple times.

3. The method of claim 1, further comprising:
    determining an identity of the mobile target communication device based on the received signal, wherein the notification to the third party includes the identity of the mobile target communication device.

4. The method of claim 1, further comprising:
    receiving signals emitted by multiple mobile target communication devices at multiple times over the time period;
    determining an identity of each of the multiple mobile target communication devices based on the signals;
    determining distances between the host communication device and each of the multiple mobile target communication devices at each of the multiple times based on the signals received at each of the multiple times;
    determining, by the processor, an amount of time within a time period that the distances between the host communication device and each of the multiple mobile target communication devices are within a distance threshold based on the distances determined for each of the multiple times;
    determining, by the processor, whether the amount of time the distances between the host communication device and a predefined number of the multiple mobile target communication devices is within the distance threshold is less than a predetermined amount of time within the time period; and
    initiating transmission of a notification to a third party via the gateway responsive to determining that the amount of time that the distances between the host communication device and the predefined number of the multiple mobile target communication devices is within the distance threshold is less than the predetermined amount of time, wherein the notification to the third party includes the identity of each of the multiple mobile target communication devices of the predefined number that are determined to be at distances within the distance threshold for the amount of time that is less than the predetermined amount of time.

5. The method of claim 1, further comprising:
    receiving signals from a group of multiple mobile target communication devices at multiple times over the time period;
    determining an identity of the group of the multiple mobile target communication devices based on the signals;
    determining distances between the host communication device and each of the multiple mobile target communication devices within the group at each of the multiple times based on the signals received at each of the multiple times;
    determining an amount of time within a time period that the distances between the host communication device and each of the multiple mobile target communication devices within the group are within a distance threshold;
    determining whether the amount of time the distances between the host communication device and each of the multiple mobile target communication devices within the group are within the distance threshold is less than a predetermined amount of time within the time period; and
    initiating transmission of a notification to a third party via a gateway responsive to determining that the amount of time that the distances between the host communication device and each of the multiple mobile target communication devices within the group is within the distance threshold is less than the predetermined amount of time, wherein the notification to the third party includes the identity of the group of the multiple mobile target communication devices.

6. The method of claim 1, wherein the third party includes at least one of a health care administrator and an individual associated with a user of the host communication device.

7. The method of claim 1, further comprising:
determining, by the processor, that the amount of time the distance between the host communication device and the mobile target communication device is within the distance threshold is less than a predetermined amount of time within the time period responsive to the received signal emitted by the mobile target communication device not being received by the host communication device for the amount of time that is less than the predetermined amount of time.

8. The method of claim 1, wherein the predetermined amount of time is adjustable based upon circumstances of a user of the mobile target communication device.

9. The method of claim 1, wherein the distance threshold is adjustable based upon circumstances of a user of the mobile target communication device.

10. The method of claim 1, wherein the third party to which the notification is initiated is adjustable based upon circumstances of a user of the mobile target communication device.

11. A system within a host communication device, comprising:
a processor; and
a memory having stored thereon instructions which, when executed by the processor, cause the processor to perform operations comprising:
determining a distance between the host communication device and a mobile target communication device at each of multiple times over a time period based on a received signal emitted by the mobile target communication device at each of the multiple times;
determining an amount of time within the time period that the distance between the host communication device and the mobile target communication device is within a distance threshold based on the distance determined for each of the multiple times;
determining whether the amount of time the distance between the host communication device and the mobile target communication device is within the distance threshold is less than a predetermined amount of time within the time period; and
initiating transmission of a notification to a third party via a gateway responsive to determining that the amount of time that the distance between the host communication device and the mobile target communication device is within the distance threshold is less than the predetermined amount of time.

12. The system of claim 11, wherein determining the distance between the host communication device and the mobile target communication device based on the received signal received at each of the multiple times includes determining a signal strength of the received signal received at each of the multiple times and estimating the distance between the host communication device and the mobile target communication device at each of the multiple times based on the signal strength of the received signal received at each of the multiple times.

13. The system of claim 11, wherein the instructions, when executed by the processor, further cause the processor to perform:
determining an identity of the mobile target communication device based on the received signal, wherein the notification to the third party includes the identity of the mobile target communication device.

14. The system of claim 11, wherein the instructions, when executed by the processor, further cause the processor to perform:
receiving signals emitted by multiple mobile target communication devices at multiple times over the time period;
determining an identity of each of the multiple mobile target communication devices based on the signals;
determining distances between the host communication device and each of the multiple mobile target communication devices at each of the multiple times based on the signals received at each of the multiple times;
determining an amount of time within a time period that the distances between the host communication device and each of the multiple mobile target communication devices are within a distance threshold based on the distances determined for each of the multiple times;
determining whether the amount of time the distances between the host communication device and a predefined number of the multiple mobile target communication devices is within the distance threshold is less than a predetermined amount of time within the time period; and
initiating transmission of a notification to a third party via the gateway responsive to determining that the amount of time that the distances between the host communication device and the predefined number of the multiple mobile target communication devices is within the distance threshold is less than the predetermined amount of time, wherein the notification to the third party includes the identity of each of the multiple mobile target communication devices of the predefined number that are determined to be at distances within the distance threshold for the amount of time that is less than the predetermined amount of time.

15. The system of claim 11, wherein the instructions, when executed by the processor, further cause the processor to perform:
receiving signals from a group of multiple mobile target communication devices at multiple times over the time period;
determining an identity of the group of the multiple mobile target communication devices based on the signals;
determining distances between the host communication device and each of the multiple mobile target communication devices within the group at each of the multiple times based on the signals received at each of the multiple times;
determining an amount of time within a time period that the distances between the host communication device and each of the multiple mobile target communication devices within the group are within a distance threshold;
determining whether the amount of time the distances between the host communication device and each of the multiple mobile target communication devices within the group are within the distance threshold is less than a predetermined amount of time within the time period; and
initiating transmission of a notification to a third party via a gateway responsive to determining that the amount of time that the distances between the host communication device and each of the multiple mobile target communication devices within the group is within the distance threshold is less than the predetermined amount of time, wherein the notification to the third party includes the identity of the group of the multiple mobile target communication devices.

16. A computer readable storage device within a host communication device, the computer readable storage device having instructions encoded thereon which, when executed by a processor, cause the processor to perform operations comprising:
- determining a distance between the host communication device and a mobile target communication device at each of multiple times over a time period based on a received signal emitted by the mobile target communication device at each of the multiple times;
- determining an amount of time within the time period that the distance between the host communication device and the mobile target communication device is within a distance threshold based on the distance determined for each of the multiple times;
- determining whether the amount of time the distance between the host communication device and the mobile target communication device is within the distance threshold is less than a predetermined amount of time within the time period; and
- initiating transmission of a notification to a third patty via a gateway responsive to determining that the amount of time that the distance between the host communication device and the mobile target communication device is within the distance threshold is less than the predetermined amount of time.

17. The computer readable storage device of claim 16, wherein determining the distance between the host communication device and the mobile target communication device based on the received signal received at each of the multiple times includes determining a signal strength of the received signal received at each of the multiple times and estimating the distance between the host communication device and the mobile target communication device at each of the multiple times based on the signal strength of the received signal received at each of the multiple times.

18. The computer readable storage device of claim 16, wherein the instructions, when executed by the processor, further cause the processor to perform:
- determining an identity of the mobile target communication device based on the received signal, wherein the notification to the third party includes the identity of the mobile target communication device.

19. The computer readable storage device of claim 16, wherein the instructions, when executed by the processor, further cause the processor to perform:
- receiving signals emitted by multiple mobile target communication devices at multiple times over the time period;
- determining an identity of each of the multiple mobile target communication devices based on the signals;
- determining distances between the host communication device and each of the multiple mobile target communication devices at each of the multiple times based on the signals received at each of the multiple times;
- determining an amount of time within a time period that the distances between the host communication device and each of the multiple mobile target communication devices are within a distance threshold based on the distances determined for each of the multiple times;
- determining whether the amount of time the distances between the host communication device and a predefined number of the multiple mobile target communication devices is within the distance threshold is less than a predetermined amount of time within the time period; and
- initiating transmission of a notification to a third party via the gateway responsive to determining that the amount of time that the distances between the host communication device and the predefined number of the multiple mobile target communication devices is within the distance threshold is less than the predetermined amount of time, wherein the notification to the third party includes the identity of each of the multiple mobile target communication devices of the predefined number that are determined to be at distances within the distance threshold for the amount of time that is less than the predetermined amount of time.

20. The computer readable storage device of claim 16, wherein the instructions, when executed by the processor, further cause the processor to perform:
- receiving signals from a group of multiple mobile target communication devices at multiple times over the time period;
- determining an identity of the group of the multiple mobile target communication devices based on the signals;
- determining distances between the host communication device and each of the multiple mobile target communication devices within the group at each of the multiple times based on the signals received at each of the multiple times;
- determining an amount of time within a time period that the distances between the host communication device and each of the multiple mobile target communication devices within the group are within a distance threshold;
- determining whether the amount of time the distances between the host communication device and each of the multiple mobile target communication devices within the group are within the distance threshold is less than a predetermined amount of time within the time period; and
- initiating transmission of a notification to a third party via a gateway responsive to determining that the amount of time that the distances between the host communication device and each of the multiple mobile target communication devices within the group is within the distance threshold is less than the predetermined amount of time, wherein the notification to the third party includes the identity of the group of the multiple mobile target communication devices.

* * * * *